United States Patent
Okuda

(10) Patent No.: US 10,678,205 B2
(45) Date of Patent: Jun. 9, 2020

(54) INSTRUMENTATION CONTROL SYSTEM

(71) Applicant: Mitsubishi Electric Corporation, Chiyoda-ku, Tokyo (JP)

(72) Inventor: Susumu Okuda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 32 days.

(21) Appl. No.: 15/704,328

(22) Filed: Sep. 14, 2017

(65) Prior Publication Data
US 2019/0004492 A1 Jan. 3, 2019

(30) Foreign Application Priority Data
Jun. 30, 2017 (JP) .................... 2017-128144

(51) Int. Cl.
*G05B 19/042* (2006.01)

(52) U.S. Cl.
CPC ............ *G05B 19/0423* (2013.01); *G05B 2219/21016* (2013.01)

(58) Field of Classification Search
CPC ............. G05B 19/0423; G05B 2219/21016
See application file for complete search history.

(56) References Cited

U.S. PATENT DOCUMENTS

| | | | |
|---|---|---|---|
| 5,771,511 A * | 6/1998 | Kummer | A61G 7/015 5/600 |
| 9,521,009 B1 * | 12/2016 | Skeffington | H04L 12/2827 |
| 9,733,277 B2 * | 8/2017 | Itaya | H02J 3/1878 |
| 9,825,465 B2 * | 11/2017 | Itaya | H02J 3/16 |
| 9,843,195 B2 * | 12/2017 | Itaya | H02J 3/14 |
| 2003/0168316 A1 * | 9/2003 | Knepple | B65G 37/02 198/460.1 |
| 2013/0226357 A1 * | 8/2013 | Ersavas | A01G 25/167 700/284 |
| 2014/0288725 A1 * | 9/2014 | Itaya | H02J 3/00 700/298 |
| 2017/0351232 A1 * | 12/2017 | Chen | G05B 15/02 |
| 2018/0283148 A1 * | 10/2018 | Ortiz | G05B 19/042 |
| 2018/0359155 A1 * | 12/2018 | Kaag | H04L 41/0823 |
| 2019/0041816 A1 * | 2/2019 | Rivas Sabelle | E03B 1/00 |

FOREIGN PATENT DOCUMENTS

JP 2006-58983 A 3/2006

* cited by examiner

*Primary Examiner* — Thomas C Lee
*Assistant Examiner* — Michael Tang
(74) *Attorney, Agent, or Firm* — Buchanan Ingersoll & Rooney PC

(57) ABSTRACT

This instrumentation control system includes: input/output modules provided correspondingly and adjacently to respective field devices; control logic units implemented inside the input/output modules and performing various control calculation processes for the field devices; and a communication network connecting the input/output modules to each other by a communication line.

6 Claims, 5 Drawing Sheets

INSTRUMENTATION CONTROL SYSTEM

BACKGROUND OF THE INVENTION

1. Field of the Invention

The present invention relates to instrumentation control systems provided to various types of plants such as a nuclear power plant and an industrial plant, and in particular, relates to technology for reducing the cable amount and the installation space of a calculation processing unit.

2. Description of the Background Art

In recent years, in the nuclear market, small-size reactors such as a SMR (Small Modular Reactor) have been developed as next-generation plants. One of advantages of such a small-size reactor is that the installation area of the plant is small. For compactification of the plant installation area, compactification of an instrumentation control system which performs plant control is also required.

In the instrumentation control system, process data obtained by various sensors such as a thermometer, a pressure meter, a level meter, and a flowmeter are monitored, and actuators such as a control valve, a pump, a motor, and a cylinder are controlled on the basis of control variables obtained from the monitoring result. In such an instrumentation control system, in order to meet the compactification requirement, it is desired to reduce the amount of cables connecting between field devices (the above various sensors, various actuators, and the like) and input/output modules for performing input and output of signals from and to these field devices, reduce the installation space of the input/output modules, and reduce the installation space of a calculation processing device for performing various control calculation processes on process data obtained from each input/output module.

In a conventional instrumentation control system, a distributed-type system having a hierarchical structure is employed, an input/output module is individually provided for each field device, the input/output module and the field device are connected by an analog line, and a calculation processing device is connected to each of a necessary number of input/output modules by digital lines.

A signal obtained by each sensor is inputted to the input/output module and is digitized, and then the digitized signal is transmitted as process data to the calculation processing device, to perform various calculation processes. On the other hand, control data obtained by the calculation processing device is transmitted to the input/output module and is converted to an analog signal, and then the analog signal is outputted to each actuator, to control operation of the actuator (see, for example, Patent Document 1 below).

Patent Document 1: Japanese Laid-Open Patent Publication No. 2006-58983

In a safety protection system for a nuclear power plant, due to severe restriction requirements, application of an intelligent device adapted to field communication has not actually progressed. That is, in the conventional technique as described in Patent Document 1, each input/output module mainly serves only a role of functioning as an input/output interface, but does not perform various calculation processes. Therefore, it is necessary to provide a calculation processing device for performing various calculation processes, separately from the input/output module. Thus, it is necessary to install a board housing in which the input/output module is stored and a board housing in which the calculation processing device is stored, so that it is necessary to ensure a large space for installing the board housings.

Further, in the conventional technology, since each input/output module is located away from the field device, the length of the analog line connecting between the field device and the input/output module is long. In addition, since the input/output module and the calculation processing device are connected by the digital line, the connection cable amount in the entire system is also large.

SUMMARY OF THE INVENTION

The present invention has been made to solve the above problem, and an object of the present invention is to provide an instrumentation control system which enables compactification of the system by reducing the cable amount in the entire system and reducing the entire installation space of the input/output modules and the calculation processing units.

An instrumentation control system according to the present invention includes: input/output modules provided correspondingly and adjacently to respective field devices; control logic units implemented inside the input/output modules and performing various control calculation processes for the field devices; and a communication network connecting the input/output modules to each other by a communication line.

In the instrumentation control system according to the present invention, since the control logic units for performing control calculation processes are implemented inside the input/output modules, a board housing in which a calculation processing device is stored and which has been conventionally installed separately is not needed, and thus the installation space of control equipment can be reduced. In addition, it is possible to reduce the cable amount of a digital line which has been conventionally needed for connecting between the input/output module and the calculation processing device. Further, since the input/output module is provided adjacently to each field device, it is also possible to reduce the amount of a cable connecting between the input/output module and the field device. Thus, compactification of the entire instrumentation control system can be achieved.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
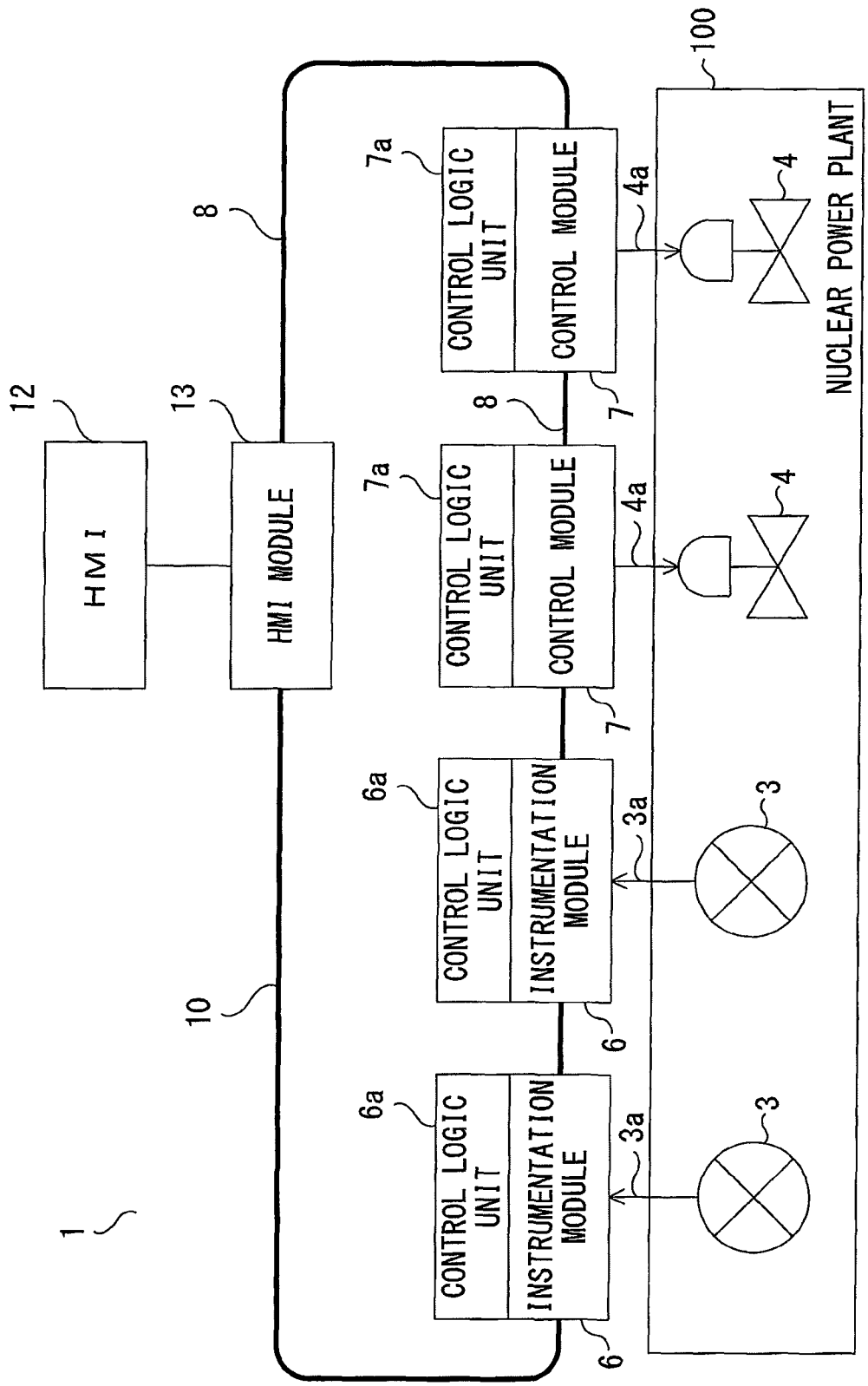
FIG. 1 is a configuration diagram showing an instrumentation control system according to the first embodiment of the present invention.

FIG. 1 is a configuration diagram showing an instrumentation control system according to the first embodiment of the present invention. In the first embodiment, an example in which the instrumentation control system according to the present invention is applied to a nuclear power plant, is shown. However, without limitation to a nuclear power plant, the instrumentation control system of the present invention is widely applicable also to other plants such as an industrial plant.

The instrumentation control system 1 of the first embodiment includes, in a plant: various sensors 3 such as a thermometer, a pressure meter, a level meter, and a flowmeter; and actuators 4 such as a control valve, a pump, a motor, and a cylinder. Here, the above various sensors 3 and various actuators 4 are collectively referred to as field devices.

In the first embodiment, instrumentation modules 6 are individually provided adjacently to the various sensors 3, and control modules 7 are individually provided adjacently to the various actuators 4. The various sensors 3 and the instrumentation modules 6 are connected by communication lines 3a such as analog lines, and the various actuators 4 and the control modules 7 are connected by communication lines 4a such as analog lines. Here, the instrumentation modules 6 and the control modules 7 are collectively referred to as input/output modules.

Inside the respective input/output modules (instrumentation modules 6 and control modules 7), control logic units 6a and control logic units 7a for performing various control calculation processes with respect to the field devices (sensors) 3 and the field devices (actuator) 4 are implemented, and input/output interfaces (not shown) including modems for digital/analog conversion are provided. The input/output modules 6 and 7 are connected to each other by a wired communication cable (bus line) 8 as a communication line, thereby configuring a communication network 10.

Figure 2:
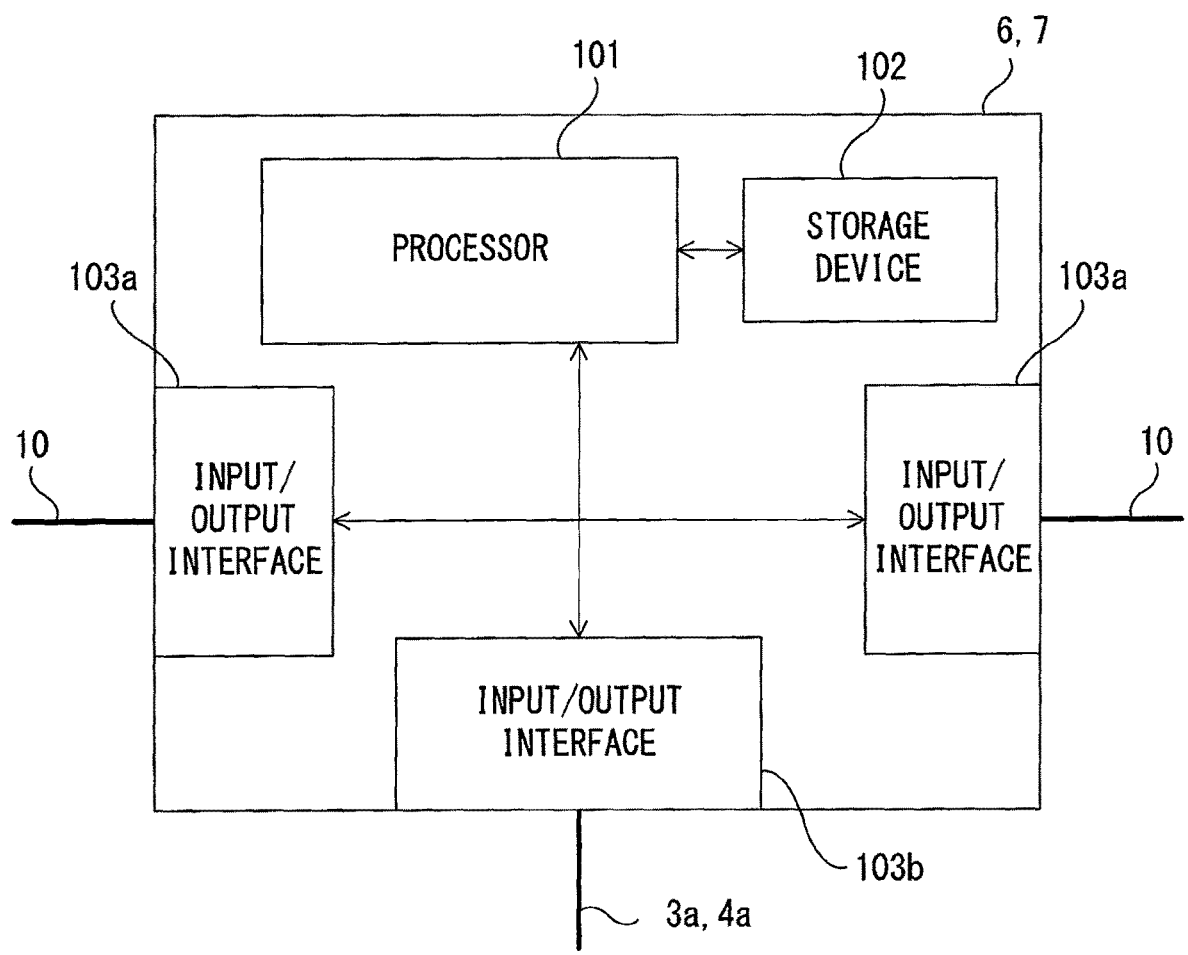
FIG. 2 is a diagram showing an example of hardware of input/output modules shown in FIG. 1.

FIG. 2 shows an example of hardware of the instrumentation modules 6 and the control modules 7 as input/output modules. As shown in the example in FIG. 2, the instrumentation modules 6 and the control modules 7 each include: a processor 101 for performing a calculation process; a storage device 102 having a volatile storage device such as a random access memory and a nonvolatile auxiliary storage device such as a flash memory; input/output interfaces 103a for performing input and output of data via the communication network 10; and an input/output interface 103b for performing input and output of data from and to the field device 3 or 4 via the communication line 3a or 4a. Instead of the flash memory, an auxiliary storage device such as a hard disk may be provided. The processor 101 performs various calculation processes on the basis of a calculation program stored in the storage device 102. Here, the processor 101 and the storage device 102 correspond to the control logic unit 6a, 7a of the present embodiment.

Figure 3:
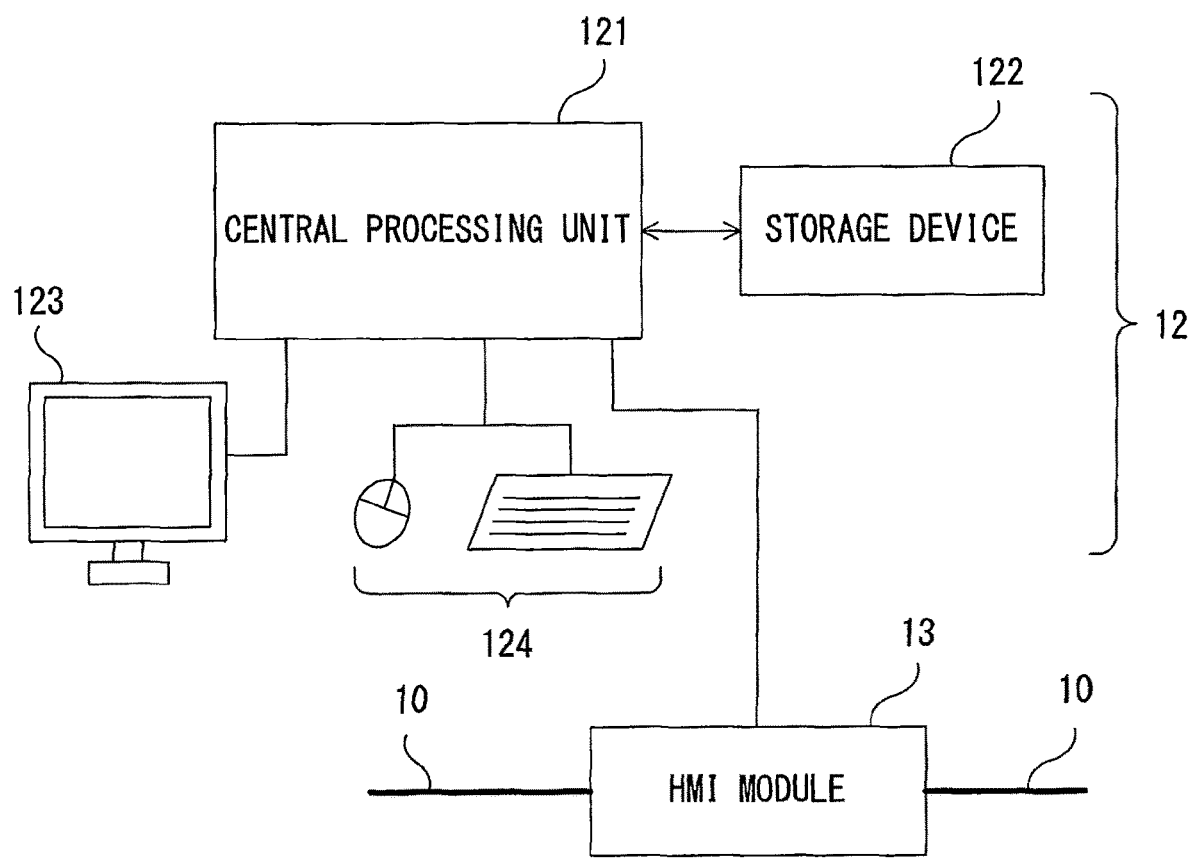
FIG. 3 is a diagram showing an example of the configuration of an HMI as a central monitoring control device shown in FIG. 1.

The instrumentation control system 1 is provided with an HMI (human machine interface) 12 serving as a central monitoring control device. As shown in FIG. 3, the HMI 12 includes: a central processing unit 121; a storage device 122 such as a memory and a hard disk; a display device 123 such as a display; and an input device 124 such as a mouse and a keyboard. An HMI module 13 for input/output of data is connected to the HMI 12, and the HMI module 13 is connected to the communication network 10.

Operation of the instrumentation control system 1 having the above configuration will be described.

The input/output interface 103b of the instrumentation module 6 receives a signal from the corresponding sensor 3 and digitizes the signal, and transfers the signal to the control logic unit 6a. The control logic unit 6a executes calculation (noise elimination, alarm determination, calculation of comparison with a reference signal, and the like) on the inputted signal, on the basis of a control logic (a calculation program stored in the storage device 102 in FIG. 2) implemented in the control logic unit 6a. The instrumentation module 6 outputs, as process data, the above calculation result to the control module 7 from the input/output interface 103a via the communication network 10. In addition, the input/output interface 103a of the instrumentation module 6 outputs the calculation result to the HMI module 13 via the communication network 10.

On the other hand, the input/output interface 103a of the control module 7 receives a signal transmitted from the instrumentation module 6 via the communication network 10, and receives a signal transmitted from the HMI module 13 via the communication network 10. The control logic unit 7a executes logic calculation (sequence control, process control calculation) on the received signal, on the basis of a control logic (calculation program stored in the storage device 102 in FIG. 2) implemented in the control logic unit 7a, and outputs the calculation result to the actuator 4 via the input/output interface 103b. Thus, the actuator 4 is automatically controlled by the control module 7 on the basis of the process data obtained by the instrumentation module 6.

In addition, since the instrumentation module 6 transmits the process data to the HMI module 13 via the communication network 10, the HMI module 13 transfers the process data obtained from each sensor 3, to the HMI 12. Thus, it is possible to monitor the current operation states of the sensors 3 and the actuators 4, by the HMI 12 displaying the process data on a screen, for example.

As a result of the monitoring, if it is necessary to, for example, change a control variable of the process data, a command for, for example, changing the control variable is given from the HMI 12. The command from the HMI 12 is transmitted from the HMI module 13 to the control module 7 via the communication network 10. The control logic unit 7a of the control module 7 executes logic calculation on the basis of the command from the HMI 12, and controls the actuator 4 on the basis of the logic calculation.

In the instrumentation control system 1 having the above configuration, the control logics implemented in the input/output modules (instrumentation modules 6 and the control modules 7) can be changed via the HMI module 13 from the HMI 12. Therefore, it is possible to easily change the program design without moving a program generator or the like to the vicinity of the instrumentation modules 6 and the control modules 7 in order to change the control logic design of the control logic units 6a and 7a.

As described above, in the instrumentation control system of the first embodiment, since the control logic unit for performing the control calculation process is implemented inside each input/output module, a board housing in which a calculation processing device is stored and which has been conventionally provided separately is not needed, and thus the installation space of control equipment can be reduced. In addition, it is possible to reduce the cable amount of a digital line which has been conventionally needed for connecting between the input/output module and the calculation processing device. Further, since the input/output module is provided adjacently to each field device, it is also possible to reduce the amount of a cable connecting between the input/output module and the field device. Thus, compactification of the entire instrumentation control system can be achieved.

Second Embodiment

Figure 4:
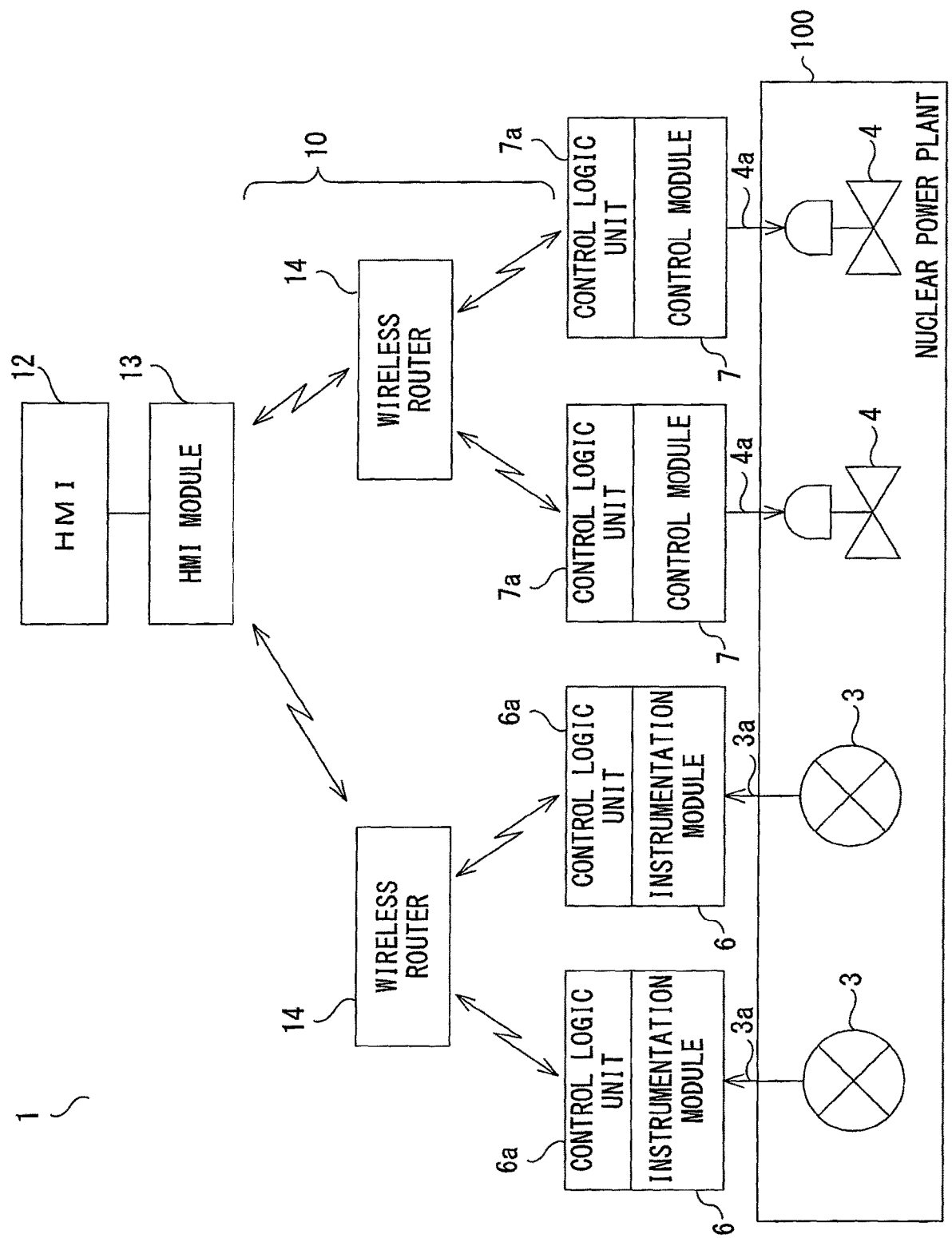
FIG. 4 is a configuration diagram showing an instrumentation control system according to the second embodiment of the present invention.

FIG. 4 is a configuration diagram showing an instrumentation control system 1 according to the second embodiment of the present invention. The components that correspond to or are the same as those in the first embodiment shown in FIG. 1 are denoted by the same reference characters.

In the first embodiment shown in FIG. 1, connection among the instrumentation modules 6, the control modules 7, and the HMI module 13 is established by applying the wired communication cable 8 as a communication line for configuring the communication network 10. On the other hand, in the second embodiment, as shown in FIG. 4, as a communication network 10, a wireless router 14 as a master unit is provided, and the input/output modules 6, the input/output modules 7, and the HMI module 13 are each provided with a wireless communicator as a slave unit, to configure a wireless LAN.

As described above, in the second embodiment, it is possible to realize an instrumentation control system without using a cable, by applying a wireless LAN as a communication network. Therefore, the degree of freedom in installation of the field devices at an actual site increases, and the cable amount can be further reduced as compared to the case of the first embodiment, whereby compactification of the entire system can be achieved.

Third Embodiment

Figure 5:
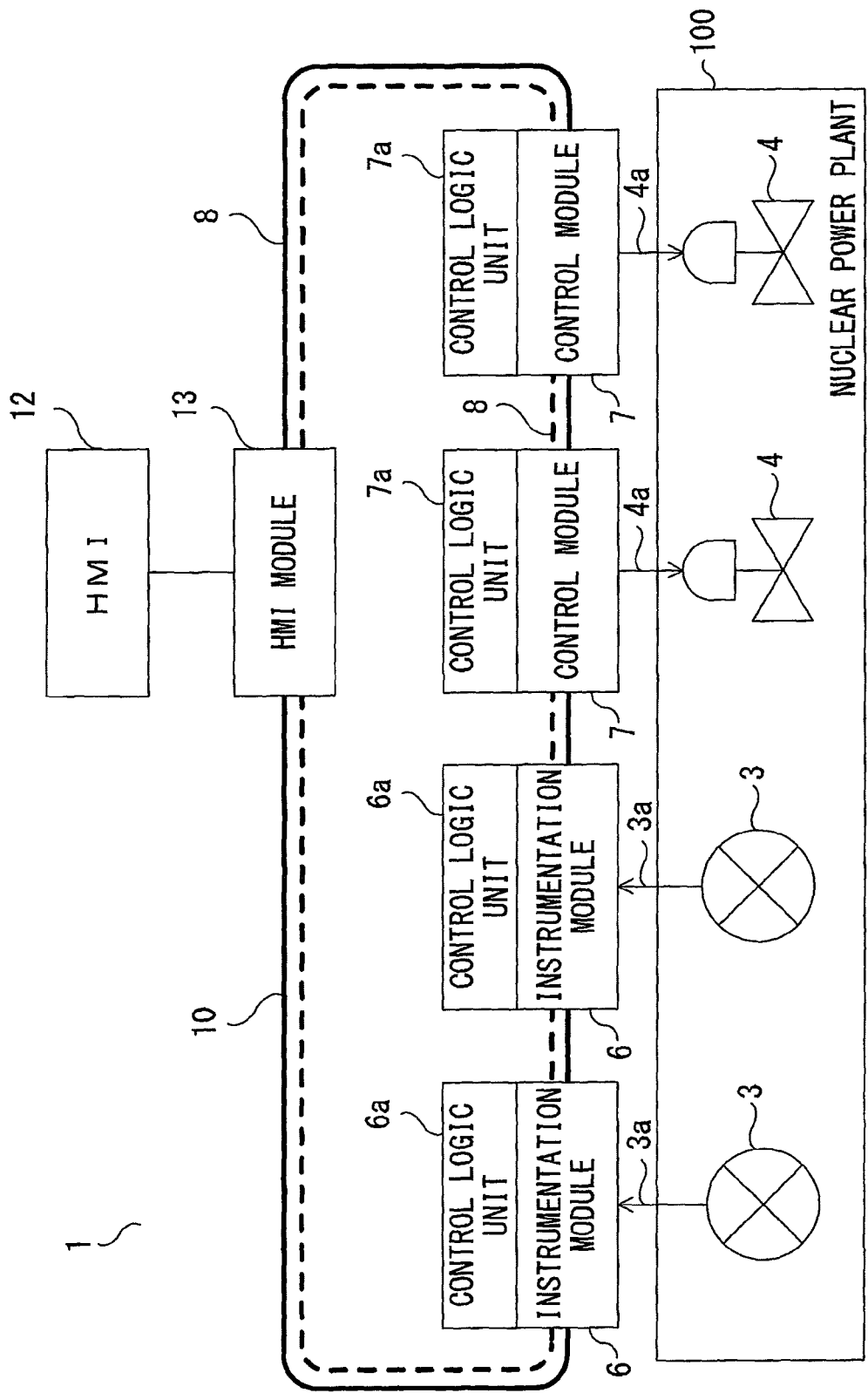
FIG. 5 is a configuration diagram showing an instrumentation control system according to the third embodiment of the present invention.

FIG. 5 is a configuration diagram showing an instrumentation control system 1 according to the third embodiment of the present invention. The components that correspond to or are the same as those in the first embodiment shown in FIG. 1 are denoted by the same reference characters.

In the first embodiment shown in FIG. 1, as a communication line for configuring the communication network 10, the wired communication cable 8 is used. In the third embodiment, as shown in FIG. 5, power can be supplied to the input/output modules 6, 7, using the communication cable 8.

That is, in the third embodiment, known power supply transmission technology such as PoE (Power over Ethernet), EtherCAT P, or USB PD (USB Power Delivery) is applied to the communication network 10, whereby so-called input/output bus power feeding is performed in which the communication cable 8 is caused to also serve to supply power to the instrumentation modules 6 and the control modules 7. Thus, the installation amount of power supply cables is reduced.

It is noted that the present invention is not limited to only the configurations of the first to third embodiments. Without deviating from the scope of claims, the configuration of each of the first to third embodiments may be partially modified or partially omitted, or the configurations of the first to third embodiments may be combined as appropriate.

Various modifications and alterations of this invention will be apparent to those skilled in the art without departing from the scope and spirit of this invention, and it should be understood that this is not limited to the illustrative embodiments set forth herein.

What is claimed is:

1. An instrumentation control system comprising:
a plurality of input/output modules, wherein
each input/output module of the plurality of input/output modules (i) is provided adjacently to and is connected to, via an analog line, a respective field device of a plurality of field devices, (ii) is configured to receive a signal from or transmit a signal to the respective adjacent field device, and (iii) includes a control logic unit configured to perform various control calculation processes for the respective field device; and
a communication network connecting the plurality of input/output modules to each other by a communication line, wherein
a first field device, of the plurality of field devices, is connected to and transmits a first signal to a first input/output module,
a second field device, of the plurality of field devices, is connected to a second input/output module,
the first input/output module includes an instrumentation module that transfers the first signal from the first field device, to the control logic unit included in the first input/output module, and the control logic unit executes a calculation process on the first signal and outputs a calculation result, as process data, via the communication network, to (i) the second input/output module, and (ii) a central monitoring control device,
the second input/output module includes a control module and receives a signal from the central monitoring control device, receives the process data, from the instrumentation module of the first input/output module, executes a logic calculation on the received process data, and outputs a result of the logic calculation to the second field device connected thereto, and
the central monitoring control device is connected to the communication network, monitors an operation state of each field device, and outputs a command for changing a control variable of the process data, to the control module of the second input/output module.

2. The instrumentation control system according to claim 1, wherein the central monitoring control device changes control logics implemented in the instrumentation module and the control module.

3. The instrumentation control system according to claim 1, wherein in the communication network, a wireless router is provided, and each input/output module is provided with a wireless communicator, thereby configuring a wireless LAN (Local Area Network).

4. The instrumentation control system according to claim 2, wherein in the communication network, a wireless router is provided, and each input/output module is provided with a wireless communicator, thereby configuring a wireless LAN.

5. The instrumentation control system according to claim 1, wherein in the communication network, input/output bus power feeding is performed using a communication cable also as a power supply cable.

6. The instrumentation control system according to claim 2, wherein in the communication network, input/output bus power feeding is performed using a communication cable also as a power supply cable.

* * * * *